(12) United States Patent
Lopez et al.

(10) Patent No.: US 12,341,632 B2
(45) Date of Patent: Jun. 24, 2025

(54) MEASUREMENT SIGNALS FOR SENSING

(71) Applicant: Telefonaktiebolaget LM Ericsson (publ), Stockholm (SE)

(72) Inventors: Miguel Lopez, Solna (SE); Leif Wilhelmsson, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 37 days.

(21) Appl. No.: 18/004,728

(22) PCT Filed: Jul. 10, 2020

(86) PCT No.: PCT/EP2020/069565
§ 371 (c)(1),
(2) Date: Jan. 9, 2023

(87) PCT Pub. No.: WO2022/008074
PCT Pub. Date: Jan. 13, 2022

(65) Prior Publication Data
US 2023/0254184 A1    Aug. 10, 2023

(51) Int. Cl.
*H04L 25/02* (2006.01)
*H04L 27/26* (2006.01)
*H04W 74/0808* (2024.01)

(52) U.S. Cl.
CPC ........ *H04L 25/0226* (2013.01); *H04L 25/023* (2013.01); *H04L 27/2613* (2013.01); *H04W 74/0808* (2013.01)

(58) Field of Classification Search
CPC ............... H04L 25/0226; H04L 25/023; H04L 27/2613; H04W 74/0808

USPC .......................................................... 375/224
See application file for complete search history.

(56) References Cited

U.S. PATENT DOCUMENTS

| | | | | |
|---|---|---|---|---|
| 7,372,825 | B1 * | 5/2008 | Schmidl | H04B 7/2656 370/328 |
| 2018/0048503 | A1 * | 2/2018 | Kim | H04L 27/26 |
| 2018/0248603 | A1 | 8/2018 | Kasher et al. | |
| 2019/0074873 | A1 * | 3/2019 | Liu | H04B 7/0417 |
| 2019/0090255 | A1 * | 3/2019 | Merlin | H04W 16/14 |
| 2019/0095380 | A1 * | 3/2019 | Das Sharma | G06F 13/4282 |
| 2019/0379500 | A1 * | 12/2019 | Hu | H04B 7/0452 |

(Continued)

OTHER PUBLICATIONS

U.S. Appl. No. 18/004,347 (Year: 2020).*

(Continued)

*Primary Examiner* — Kevin M Burd
(74) *Attorney, Agent, or Firm* — Weisberg I.P. Law, P.A.

(57) ABSTRACT

A method is disclosed of a transmitter configured to transmit a physical layer packet comprising a plurality of measurement signals for channel estimation. The method includes configuring the transmitter to use different precoding settings for at least two of the plurality of measurement signals for channel estimation, and transmitting the physical layer packet. In some embodiments, at least one of the plurality of measurement signals for channel estimation occurs outside of a preamble of the physical layer packet (e.g., in a midamble). A method of a corresponding receiver is also disclosed. Corresponding apparatuses, wireless communication device, and computer program product are also disclosed.

19 Claims, 2 Drawing Sheets

(56) References Cited

U.S. PATENT DOCUMENTS

2021/0274558 A1* 9/2021 Takata ................ H04L 5/0048

OTHER PUBLICATIONS

International Search Report and Written Opinion dated May 3, 2021 for International Application No. PCT/EP2020/069565 filed Jul. 10, 2020; consisting of 16 pages.

IEEE P802.11ax/D6.0 (amendment to IEEE P802.11REVmd/D3.0) Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN; Prepared by the 802.11 Working Group of the LAN/MAN Standards Committee of the IEEE Computer Society; Nov. 2019; consisting of 780 pages.

Da Silva, C.; IEEE P802.11, Wireless LANs; 802.11 SENS SG Proposed PAR; doc.: IEEE 802.11-19/2103r5; Jan. 14, 2020; consisting of 4 pages.

* cited by examiner

MEASUREMENT SIGNALS FOR SENSING

CROSS-REFERENCE TO RELATED APPLICATION

This application is a Submission Under 35 U.S.C. § 371 for U.S. National Stage Patent Application of International Application Number: PCT/EP2020/069565, filed Jul. 10, 2020 entitled "MEASUREMENT SIGNALS FOR SENSING," the entirety of which is incorporated herein by reference.

TECHNICAL FIELD

The present disclosure relates generally to the field of sensing; e.g., wireless local area network (WLAN) sensing. More particularly, it relates to provision of measurement signals for channel estimation in the context of sensing.

BACKGROUND

The IEEE 802.11 standardization group has approved a Project Authorization Request (PAR) for wireless local area network (WLAN) sensing, one object of which is to develop an amendment to the IEEE 802.11 standard as follows.

"This amendment defines modifications to the IEEE 802.11 medium access control layer (MAC), the physical layer (PHY) of Directional Multi Gigabit (DMG), and the PHY under development of Next Generation 60 GHz (NG60) that enhance Wireless Local Area Network (WLAN) sensing (SENS) operation in license-exempt frequency bands between 1 GHz and 7.125 GHz and above 45 GHz. This amendment defines:

at least one mode that enables stations (STAs) to perform one or more of the following: to exchange WLAN sensing capabilities, to request and setup transmissions that allow for WLAN sensing measurements to be performed, to indicate that a transmission can be used for WLAN sensing, and to exchange WLAN sensing feedback and information;

WLAN sensing operation that relies on transmissions that are requested, unsolicited, or both"

Some sensing approaches use statistics based on channel estimates (e.g., changes in the propagation environment). Typically, several channel estimates are made over time and machine learning techniques, or artificial intelligence, are applied to the channel estimates in order to make inferences and/or take decisions based on the changes in the propagation environment (e.g., regarding device positioning, radio environments, etc.).

Channel estimation in IEEE 802.11 is typically based on LTFs. A long training field (LTF) comprises orthogonal frequency division multiplexing (OFDM) symbols which are known at the receiver, and generally intended for channel estimation. A legacy LTF consists of two OFDM symbols, while a high efficiency (HE) LTF consists of a variable number of OFDM symbols depending on how many streams are transmitted.

Also typically in IEEE 802.11, one or more LTFs are located in the physical layer (PHY) preamble of each PHY protocol data unit (PPDU), and sensing STAs can utilize the LTFs for channel estimation.

Generally, PPDUs used for sensing may also carry data, and the recipient of the data may be the sensing STA or another STA.

Provision of measurement signals for channel estimation may be inefficient in terms of resource utilization. Alternatively or additionally, the achievable resolution for sensing may be lower than desired.

Therefore, there is a need for alternative approaches to provision of measurement signals for channel estimation in the context of sensing.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method of a transmitter configured to transmit a physical layer packet comprising a plurality of measurement signals for channel estimation. The method comprises configuring the transmitter to use different precoding settings for at least two of the plurality of measurement signals for channel estimation, and transmitting the physical layer packet.

In some embodiments, the transmitter is configured to use different precoding settings for at least three of the plurality of measurement signals for channel estimation.

In some embodiments, at least one of the plurality of measurement signals for channel estimation is comprised in a preamble of the physical layer packet.

In some embodiments, at least one of the plurality of measurement signals for channel estimation occurs outside of a preamble of the physical layer packet.

In some embodiments, a precoding setting used for a measurement signal that occurs outside of the preamble differs from all precoding settings used for measurement signals comprised in the preamble.

In some embodiments, at least one of the plurality of measurement signals for channel estimation is comprised in a midamble of the physical layer packet.

In some embodiments, at least one of the plurality of measurement signals for channel estimation is comprised in a packet extension of the physical layer packet.

In some embodiments, configuring the different precoding settings for at least two of the plurality of measurement signals for channel estimation comprises configuring the precoding settings in accordance with a precoding setting pattern.

In some embodiments, the different precoding settings are selected from a collection of precoding settings for wireless local area network (WLAN) sensing.

In some embodiments, the precoding setting pattern provides uniform selection from the collection of precoding settings for WLAN sensing.

In some embodiments, the precoding setting pattern provides non-uniform selection from the collection of precoding settings for WLAN sensing.

In some embodiments, the method further comprises transmitting a precoding setting announcement.

In some embodiments, the precoding setting announcement is indicative of one or more of: the configured precoding settings, the configured precoding setting for one or more of the measurement signals for channel estimation, and which measurement signals for channel estimation have a same precoding setting.

In some embodiments, the precoding setting announcement is comprised in one or more of: a broadcast signal, a beacon signal, a receiver-dedicated signal, a header field of the physical layer packet, and a medium access control header field associated with the physical layer packet.

In some embodiments, the method further comprises receiving a precoding setting request for measurement signals for channel estimation, and selecting the different precoding settings based on the request.

In some embodiments, the physical layer packet is a physical layer (PHY) protocol data unit (PPDU), or a high efficiency (HE) PPDU, or an extremely high throughput (EHT) PPDU.

In some embodiments, the measurement signal for channel estimation comprises one or more of: a long training field (LTF), a HE-LTF, and an EHT-LTF.

In some embodiments, the transmitter is configured to transmit the physical layer packet in accordance with a listen-before-talk procedure.

In some embodiments, the transmitter is configured to operate in accordance with one or more of: an IEEE 802.11ax standard, an IEEE802.11be standard, and an IEEE 802.11bf standard.

A second aspect is a method of a receiver. The method comprises receiving a physical layer packet comprising a plurality of measurement signals for channel estimation, wherein different precoding settings are used for at least two of the plurality of measurement signals for channel estimation, and performing channel estimation based on the measurement signals for channel estimation.

In some embodiments, the method further comprises receiving a precoding setting announcement.

In some embodiments, the method further comprises transmitting a precoding setting request for measurement signals for channel estimation.

In some embodiments, the precoding setting request is indicative of one or more of: a precoding setting pattern, one or more precoding settings, and one or more spatial directions.

In some embodiments, the method further comprises using a channel estimation result for wireless local area network (WLAN) sensing, wherein the channel estimation result is differentiated based on the different precoding settings.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is an apparatus for a transmitter configured to transmit a physical layer packet comprising a plurality of measurement signals for channel estimation. The apparatus comprises controlling circuitry configured to cause configuration of the transmitter to use different precoding settings for at least two of the plurality of measurement signals for channel estimation, and transmission of the physical layer packet.

A fifth aspect is an apparatus for a receiver. The apparatus comprises controlling circuitry configured to cause reception of a physical layer packet comprising a plurality of measurement signals for channel estimation, wherein different precoding settings are used for at least two of the plurality of measurement signals for channel estimation, and performance of channel estimation based on the measurement signals for channel estimation.

A sixth aspect is a wireless communication device comprising the apparatus of any of the fourth and fifth aspects.

In some embodiments, any of the above aspects may additionally have features identical with or corresponding to any of the various features as explained above for any of the other aspects.

An advantage of some embodiments is that alternative approaches are provided for provision of measurement signals for channel estimation in the context of sensing.

An advantage of some embodiments is that a more flexible provision of measurement signals for channel estimation is enabled, compared to one or more other approaches for provision of measurement signals for channel estimation.

An advantage of some embodiments is that existing midambles and/or packet extension may be utilized to provide measurement signals for channel estimation in the context of sensing.

An advantage of some embodiments is that the achievable resolution for sensing may be increased, due to that different precoding settings are used for at least two measurement signals for channel estimation within a physical layer packet.

For example, some embodiments enable a sensing device to evaluate the environment using physical layer packets (each with a plurality of measurement signals for channel estimation), wherein at least some of the measurement signals for channel estimation of a physical layer packet has different precoding settings. Thereby, the spatial resolution may be increased compared to other approaches.

An advantage of some embodiments is that the provision of measurement signals for channel estimation may accommodate specific interests of the sensing device.

For example, some embodiments enable a sensing device to probe the environment by requesting that one or more particular precoding setting is used more often than others.

Thereby, the spatial direction(s) relating to such a particular precoding setting may be evaluated in increased detail.

An advantage of some embodiments is that the efficiency of provision of measurement signals for channel estimation may be increased (e.g., in terms of energy/power and/or resource utilization).

For example, although using existing midambles for sensing purposes may be beneficial, the occurrence of midambles within a PPDU is often more frequent than needed for sensing purposes. Thus, when the same precoding setting is used for all midambles within a PPDU, some of the midamble transmissions are wasteful from the sensing perspective. Some embodiments mitigate this disadvantage when different precoding settings are used for at least two midambles within a PPDU.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figures 1, 2:
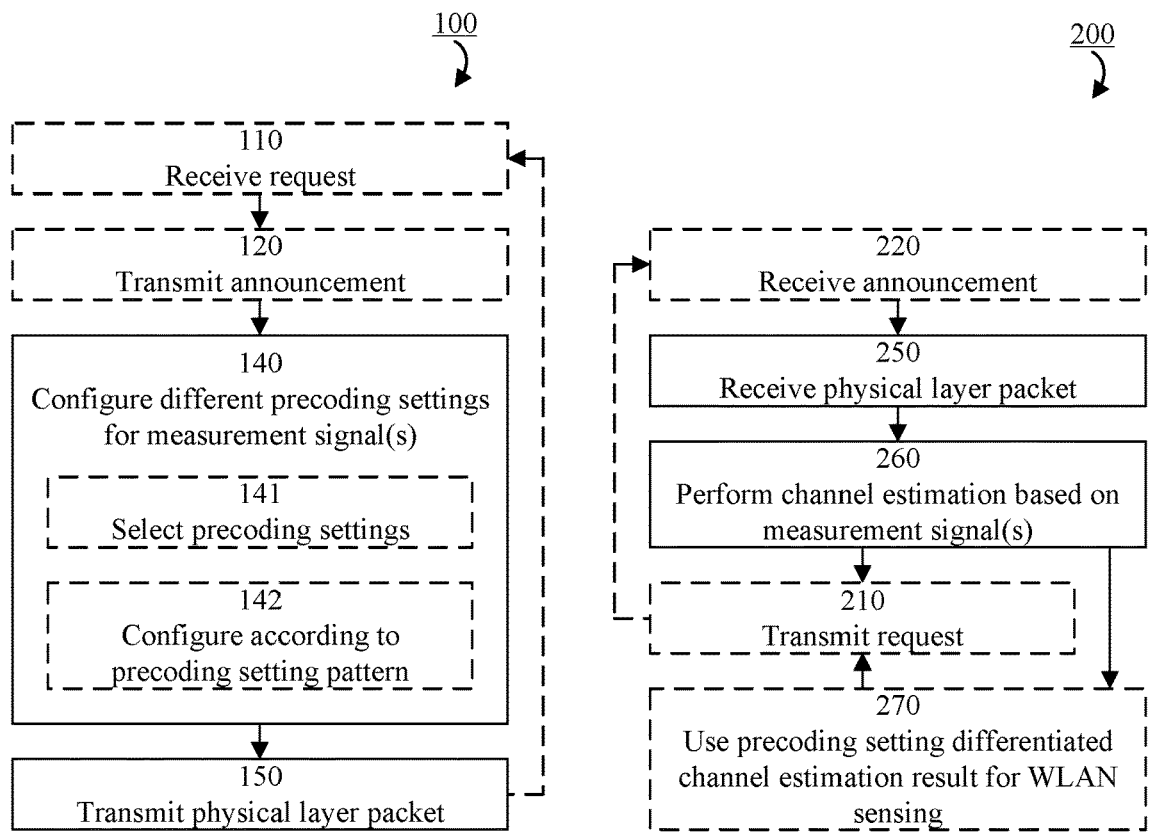
FIG. 1 is a flowchart illustrating example method steps according to some embodiments.
FIG. 2 is a flowchart illustrating example method steps according to some embodiments.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As is well known, channel estimates can be achieved by performing measurements on received signals, which are transmitted with known content. Such signals are referred to herein as measurement signals, or measurement signals for channel estimation.

Some embodiments are particularly applicable to sensing; e.g., wireless local area network (WLAN) sensing under the standardization of IEEE 802.11.

Generally, a physical layer packet (e.g., physical layer protocol data unit; PPDU) used for sensing may (or may not) also carry data. The recipient of the data may be the sensing device (STA), or may be another receiving device (STA).

Sensing devices may have different requirements on the transmitted signals than data receiving devices.

In IEEE 802.11, for example, the communications protocols have been designed for information transfer and for enabling optimization of data rates. In data communication, it is typically desirable to ensure that as much transmitted power as possible reaches the receiver. Therefore, beamforming protocols may enable channel sounding, feedback of channel state information (CSI), precoding at the transmitter, etc.

On the other hand, sensing may be generally based on monitoring channel changes over time (e.g., by monitoring CSI over a burst of PPDUs) and does not necessarily benefit from maximizing the received signal power for each channel measurement. For example, a transmitter may use a beam which has a spatial direction where no power reaches the sensing device during the reception of a first measurement signal. If a moving object suddenly appears during the transmission of a second measurement signal (using the same beam), the beam may be scattered, and some power may reach the sensing device. From such events, the sensing device can infer appearance of the object.

Thus, while a beam with no (or little) power reaching the receiving device is useless from a data communications perspective, it may be useful from a sensing perspective.

An applicable scenario for some embodiments is sensing when transmitter and receiver operate in accordance with a listen-before-talk procedure. Generally, references to a listen-before-talk (LBT) procedure are meant to include any procedure where a transmitter is required to perform measurements to determine that the channel is available (e.g., idle) before starting to transmit. Examples include carrier sense multiple access with collision avoidance (CSMA/CA).

In the following, embodiments will be described where alternative approaches are provided for channel estimation measurement signals in the context of sensing.

Generally, even if exemplification is made using a context for IEEE 802.11, it should be noted that some embodiments are equally applicable in other contexts, e.g., sensing within a context of Third Generation Partnership Project (3GPP) standards.

FIG. 1 illustrates an example method 100 for a transmitter (e.g., transmitting device and/or non-sensing device) according to some embodiments, and FIG. 2 illustrates an example (corresponding) method 200 for a receiver (e.g., receiving device and/or sensing device) according to some embodiments. FIGS. 1 and 2 are described in relation to each other in the following.

The method 100 is a method for a transmitter configured to transmit a physical layer packet comprising a plurality of measurement signals for channel estimation. Correspondingly, the method 200 is a method for a receiver configured to receive a physical layer packet comprising a plurality of measurement signals for channel estimation.

The transmitter and receiver are typically configured to operate (e.g., transmit/receive the physical layer packet) in accordance with a listen-before-talk procedure. For example, the transmitter and receiver may be configured to operate in accordance with one or more of: an IEEE 802.11ax standard, an IEEE 802.11be standard, an IEEE 802.11bf standard, or any other suitable IEEE 802.11 standard. Thus, the transmitter may be a WLAN transmitter and the receiver may be a WLAN receiver.

When the transmitter is a WLAN transmitter and/or when the receiver is a WLAN receiver, the physical layer packet may be a physical layer (PHY) protocol data unit (PPDU), a high efficiency (HE) PPDU, an extremely high throughput (EHT) PPDU, or a physical layer packet which is compatible with any of these PPDU formats; and each measurement signal for channel estimation may correspond to a long training field (LTF), a HE-LTF, or a EHT-LTF.

In step 140, the transmitter is configured to use different precoding settings for at least two (e.g., two, three, four, some, half, all but one, or all) of the plurality of measurement signals for channel estimation.

One or more (e.g., one, two, some, etc.) of the plurality of measurement signals for channel estimation may be comprised in a preamble of the physical layer packet. Alternatively or additionally, one or more (e.g., one, two, three, some, all but two, all but one, all, etc.) of the plurality of measurement signals for channel estimation may occur outside of a preamble of the physical layer packet. Alternatively or additionally, one or more (e.g., one, two, three, some, all but two, all but one, all, etc.) of the plurality of measurement signals for channel estimation may be comprised in a midamble of the physical layer packet. Alternatively or additionally, one or more (e.g., one, two, three, some, all but two, all but one, all, etc.) of the plurality of measurement signals for channel estimation may be comprised in a packet extension of the physical layer packet.

When one or more measurement signals for channel estimation are comprised in a preamble of the physical layer packet and one or more measurement signals for channel estimation occurs outside of the preamble, a precoding setting used for a measurement signal that occurs outside of the preamble may differ from all precoding settings used for measurement signals comprised in the preamble.

For example, if the preamble comprises a legacy LTF which is precoded for omni-directional transmission and a HE-LTF which is precoded for beam-formed transmission (e.g., towards a STA that is recipient of data carried by the physical layer packet), at least one (e.g., one, two, three, some, all but one, all, etc.) of the beam-formed precoding settings used for measurement signals that occur outside of the preamble (e.g., in midambles) may differ from the beam-formed precoding setting of the HE-LTF.

Alternatively or additionally, at least two (e.g., two, three, some, all, etc.) precoding settings used for measurement signals that occur outside of the preamble may differ from each other.

In a typical example, the physical layer packet has a plurality of midambles, each comprising at least one measurement signal for channel estimation, wherein different precoding settings are used for at least two (e.g., all) of the midambles.

Generally, a midamble may be defined as a non-data-carrying symbol block inserted in the data-carrying part of a physical layer packet. For example, a midamble content may correspond—fully or partly—to a content of a preamble of the physical layer packet.

A plurality of midambles may, for example, be equidistantly (or non-equidistantly) spaced within a data field of the physical layer packet. Alternatively or additionally, a midamble may be inserted at a fixed position within a data field of the physical layer packet, or may be a floating midamble (a non-data-carrying symbol block which can be inserted anywhere in a data field of the physical layer packet).

According to IEEE 802.11ax, a HE PPDU starts with a preamble comprising a legacy LTF (L-LTF) and one or more HE-LTF. The L-LTF is present to provide backward compatibility with stations supporting previous versions of the standard. IEEE 802.11ax also defines midambles to better support channel estimation in propagation environments with high Doppler shift. A midamble in IEEE 802.11ax is a group of one or more HE-LTF(s) that is inserted periodically in the data portion of the PPDU. According to IEEE 802.11ax, each HE-LTF of a midamble is identical to the HE-LTF(s) in the preamble.

IEEE 802.11ax defines one PPDU format where the same precoder is applied to both the L-LTF and the HE-LTF(s), and another PPDU format where different precoders are applied to the L-LTF and the HE-LTF(s). In either case, the precoder applied to the HE-LTF(s) is also applied to the data portion of the PPDU according to the prior art. Embodiments presented herein suggest a different approach; where different precoders may be used for different midambles within a PPDU.

The configuration of step 140 may comprise selecting the different precoding settings for the plurality of measurement signals, as illustrated by optional sub-step 141. For example, the selection may be made from a collection of precoding settings for WLAN sensing. The collection of precoding settings may be a sub-set of all available precoding settings, for example.

Alternatively or additionally, the configuration of step 140 may comprise configuring the different precoding settings for the plurality of measurement signals in accordance with a precoding setting pattern, as illustrated by optional sub-step 142.

A precoding setting pattern may refer herein to a plurality of precoding settings applied sequentially in time to the corresponding measurement signals for channel estimation. Thus, a precoding setting pattern may have a first precoding setting to be applied to a first measurement signal (e.g., a first midamble) of the physical layer packet, a second precoding setting to be applied to a second measurement signal (e.g., a second midamble) of the physical layer packet, etc.

A precoding setting pattern may relate to a single physical layer packet, or may extend over more than one physical layer packet. Alternatively or additionally, different precoding setting patterns may be applied for subsequent physical layer packets, or the same precoding setting pattern may be applied repeatedly for more than one physical layer packet.

For example, a precoding setting pattern may provide uniform or non-uniform selection from the collection of precoding settings for WLAN sensing. One example of a uniform selection comprises applying all precoding settings from the collection exactly once within the physical layer packet (e.g., a beam sweep). One example of a non-uniform selection comprises applying some precoding settings from the collection more often than others within the physical layer packet. If the collection of precoding settings for WLAN sensing together provide an equal emission in all directions, a uniform selection comprises providing an omni-directional measurement signal transmission on average.

Generally, an omni-directional transmitter configuration may be achieved using any suitable approach. For example, an omni-directional transmitter configuration may comprise performing a beam sweep using several consecutive transmissions. Alternatively or additionally, an omni-directional transmitter configuration may comprise applying cyclic shift diversity.

The physical layer packet, wherein different precoding settings are used for at least two of the plurality of measurement signals for channel estimation, is transmitted by the transmitter in step 150 and received by the receiver in step 250.

In step 260, channel estimation is performed based on the measurement signals for channel estimation. The channel estimation may be performed according to any suitable approach (e.g., according to any known approach for channel estimation).

Generally, the result of the channel estimation may be used for any suitable purpose. For example, the channel estimation result (e.g., in the form of channel state information, CSI) may be used for positioning and/or radio environment derivation (e.g., in the context of WLAN sensing). Alternatively or additionally, the channel estimation result may be used for radio calibration.

In optional step 270, the channel estimation result is used for sensing (e.g., WLAN sensing). The sensing may be performed according to any suitable approach (e.g., according to any known approach for sensing). For example, use of the channel estimation result for sensing may comprise transmitting the channel estimation result to a central processing node configured to perform WLAN sensing and/or reporting the channel estimation result to a higher layer of a protocol stack.

Since different precoding settings are used for different measurement signals for channel estimation, the channel estimation result is differentiated based on the different precoding settings, which entails that a high resolution may be achieved for the sensing based on a relatively low number of physical layer packets. Differentiation of the channel estimation result may, for example, be achieved by tagging a channel estimation result stemming from a measurement signal with an identifier corresponding (explicitly or implicitly) to the precoding setting that was used for the measurement signal.

In some embodiments, a sensing method (e.g., a WLAN sensing method) comprises causing execution of the method 200 in a plurality of sensing devices, collection of corresponding channel estimation results, and using machine learning to provide sensing results (e.g., positioning information and/or radio environment information) based on statistics of the collected channel estimation results. Such a sensing method may be performed in a sensing device (e.g., one of the receivers executing the method 200) or in a central node associated with the plurality of sensing devices.

In association with transmitting the physical layer packet, the method 100 may further comprise transmitting a precoding setting announcement, as illustrated by optional step 120. The method 200 may correspondingly comprise receiving the precoding setting announcement, as illustrated by optional step 220. It should be noted that, in other embodiments, the information of the announcement may be already known to the receivers, implicitly conveyed, or announced from a central node.

Generally, the precoding setting announcement may be transmitted before the physical layer packet or in combination with the physical layer packet. For example, the precoding setting announcement may be comprised in one or more of: a broadcast signal, a beacon signal, a receiver-dedicated signal, a header field (e.g., in a preamble) of the physical layer packet, and a medium access control (MAC) header field associated with the physical layer packet.

Generally, the precoding setting announcement is for informing the sensing device about the different precoding settings used for the plurality of measurement signals for channel estimation in the physical layer packet.

In one example, the precoding setting announcement may be indicative of the configured precoding settings (e.g., by comprising precoding setting indices corresponding to the different precoding settings used).

In one example, the precoding setting announcement may be indicative of the configured precoding setting of one or more of the measurement signals for channel estimation (e.g., by comprising a precoding setting index corresponding to the first occurring precoding setting; the other precoding settings used may be implicitly indicated—e.g., by a precoding setting pattern already known to the sensing device).

In one example, the precoding setting announcement may be indicative of which measurement signals for channel estimation have a same precoding setting. That two measurement signals for channel estimation have the same precoding setting may be interpreted as the two measurement signals for channel estimation having identical precoding settings, for example. In this example, the sensing device is not necessarily made aware of which precoding setting is used for which measurement signal, but is made aware of which measurement signals use the same precoding setting. The latter knowledge is typically sufficient for differentiation of the channel estimation result based on the different precoding settings.

Combinations of the above examples for the precoding setting announcement are also possible.

As illustrated by optional step 210, the sensing device may transmit a precoding setting request for measurement signals for channel estimation. For example, the precoding setting request may be indicative of a desired precoding setting pattern, one or more desired precoding settings, and one or more spatial directions.

Generally, the precoding setting request is for informing the transmitting device about which precoding setting(s) are particularly interesting for the sensing device; i.e., the precoding setting(s) for which the sensing device would like to get more information (i.e., measurement signals).

Typically, the precoding setting request may be based on the channel estimations of step 260 and/or the WLAN sensing of step 270. For example, the precoding setting request may be indicative of pre-coding settings where the sensing device has detected channel variations. Alternatively or additionally, the precoding setting request may be indicative of spatial directions where the probability of movement is considered to be high (e.g., above a threshold value). Alternatively or additionally, the precoding setting request may be indicative of spatial directions where information acquired from a sensor indicates movement.

The precoding setting request for measurement signals for channel estimation is received by the transmitter device as illustrated by optional step 110, and the configuration of step 140 may be based on the request. For example, the configuration of step 140 may comprise selecting precoding settings as indicated by the request.

In a typical application, the transmitter initially configures the different precoding settings for the physical layer packet in step 140 according to a default precoding setting pattern (e.g., a uniform selection from a collection of precoding settings, and/or a precoding setting pattern with omni-directional average emission), and transmits the initial physical layer packet in step 150.

The initial physical layer packet transmission be executed with or without transmission of corresponding precoding setting announcement in step 120 (for example, the default precoding setting pattern may be known to the sensing device beforehand so that no announcement is needed). The transmission of a physical layer packet according to a default precoding setting pattern may be repeated according to some embodiments.

The sensing device receives the one or more physical layer packet with default precoding setting pattern in step 250. After the sensing device has performed channel estimation on the measurement signals of the physical layer packet with default precoding setting pattern in step 260, it may determine for which of the precoding settings in the default precoding setting pattern it desires to perform enhanced channel estimations. The precoding settings of interest may be indicated (as exemplified above) in a precoding setting request to the transmitter device according to step 210.

The request is received by the transmitting device in step 110. The transmitter may adjust the configuration of the precoding settings for the physical layer packet in step 140 according to the request (e.g., to a non-uniform selection from the collection of precoding settings, where the precoding setting(s) indicated in the precoding setting request appear more often that other precoding settings of the collection). The physical layer packet with adjusted configuration is transmitted in step 150.

The physical layer packet transmission may still be executed with or without transmission of corresponding precoding setting announcement in step 120 (for example, there may be an agreement that the transmitting device always applies the requested precoding setting pattern so that no announcement is needed). The transmission of the physical layer packet according to the adjusted precoding setting pattern may be repeated according to some embodiments.

The sensing device receives the one or more physical layer packet with adjusted precoding setting pattern in step 250, and is thereby enabled to perform enhanced channel estimations for the requested precoding setting(s).

After the sensing device has performed channel estimation on the measurement signals of the physical layer packet with adjusted precoding setting pattern in step 260, it may change or maintain its determination regarding which of the precoding settings it desires to perform enhanced channel estimations. The precoding settings of interest (whether maintained or changed) may be indicated in a new precoding setting request to the transmitter device according to step 210, and so on.

The methods 100, 200 (or parts thereof) may be repeated for a plurality of physical layer packets, as suitable. For example, a single execution of steps 110/210 and/or 120/220 may be followed by repetitive execution of steps 140/150/250/260 for a corresponding collection (burst) of physical layer packets. Thus, the request and/or the announcement may be associated with a collection of physical layer packets.

Figure 3:
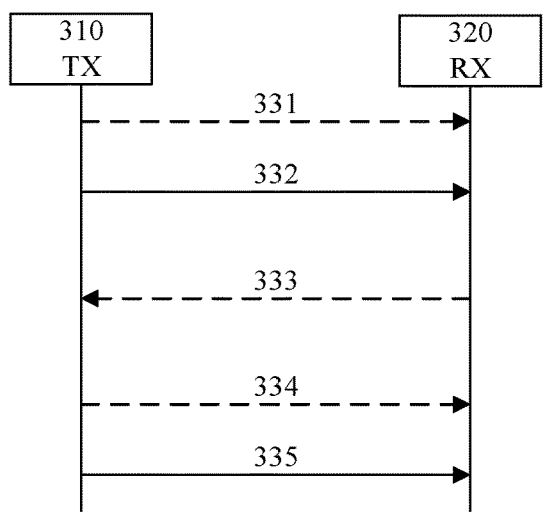
FIG. 3 is a signaling diagram illustrating example signaling according to some embodiments.

FIG. 3 schematically illustrates example signaling according to some embodiments, between a transmitter (TX; e.g., the transmitting device adapted to perform the method 100 of FIG. 1) 310 and a receiver (RX; e.g., the receiving device adapted to perform the method 200 of FIG. 2) 320.

The process is initiated by the transmitter 310. The transmitter may, or may not, start with transmission of a precoding setting announcement 331 (compare with step 120) first. In either case, the transmitter transmits the physical layer packet 332 (compare with step 150).

The receiver 320 may respond with a precoding setting request 333 (compare with step 210) indicating precoding settings of interest.

The transmitter 310 may adjust the precoding setting based on (e.g., according to) the precoding setting request, and transmit a new physical layer packet 335 (compare with step 150) accordingly; with or without a corresponding precoding setting announcement 334 (compare with step 120).

It should be noted that, in various embodiments, the process may be initiated by the transmitter (as exemplified in FIG. 3), or by the receiver, or by a central node.

Figure 4:
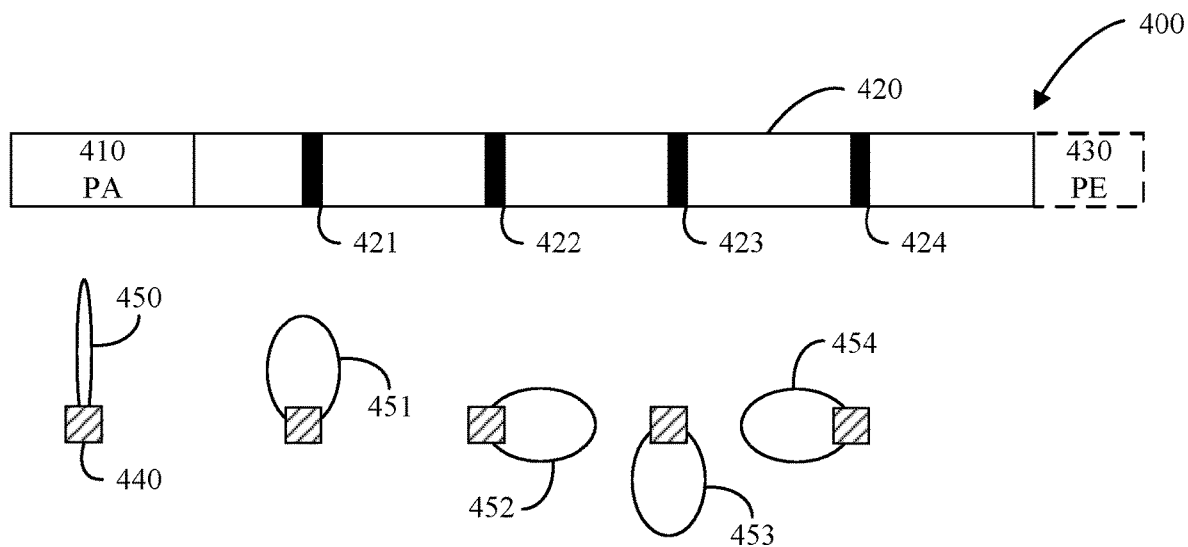
FIG. 4 is a schematic drawing illustrating an example physical layer packet according to some embodiments.

FIG. 4 schematically illustrates an example physical layer packet 400 according to some embodiments. The example physical layer packet 400 may be applicable in the context described above for the methods of FIGS. 1 and 2, for example.

The physical layer packet 400 has a preamble (PA) 410 and a data field 420. The data field is provided with a plurality of midambles 421, 422, 423, 424, wherein each midamble comprises one or more measurement signals for channel estimation. The preamble may also comprise one or more measurement signals for channel estimation. The physical layer packet may also have a packet extension (PE) field 430 comprising one or more measurement signals for channel estimation.

When the physical layer packet 400 is an IEEE 802.11 PPDU, a measurement signal for channel estimation may be an LTF or a HE-LTF.

In the lower part of FIG. 4, an example is shown illustrating different precoding settings being used, by the transmitter 440, for different measurement signals of the physical layer packet. A precoding setting resulting in a relatively narrow beam 450 is used for the measurement signal of the preamble, while precoding settings resulting in a relatively wide beam 451, 452, 453, 454 are used for the measurement signals of the midambles. Furthermore, the precoding settings used for the measurement signals of the midambles differ between different midambles; resulting in that different directions from the transmitter 440 can be sensed.

The precoding settings for the midambles in FIG. 4 may, for example, illustrate a default precoding setting pattern. If the number of midambles is larger than the number of beams to be swept, the default precoding setting pattern may comprise cyclically repeating the precoding settings for the sweeping.

Transmission of the midambles using different beams may be advantageous compared to omni-directionally transmitted measurement signals, since more details (higher spatial resolution) of the propagation channel is provided for the sensing device. Furthermore, transmission of the midambles using different beams may be advantageous compared to a single omni-directionally transmitted measurement signal, since the sensing device is provided with more received power per spatial direction.

If the sensing device requests, for example, that it desires to perform enhanced channel estimations for a direction between beams 451 and 452, the precoding settings for the midambles may be correspondingly adjusted. For example, adjusted precoding settings for the midambles may comprise using each of the precoding settings resulting in beams 451 and 452 twice in a physical later packet (and not using the precoding settings resulting in beams 453 and 454 at all in this case). Alternatively, adjusted precoding settings for the midambles may comprise using four precoding settings resulting in four relatively narrow beams in different directions between beams 451 and 452.

It should be noted that the illustration of FIG. 4 is merely an example, and that the same principles may be applied—mutatis mutandis—to other situations (e.g., with another number of midambles, with another number of precoding settings in the collection, with other directions and/or widths of beams, etc.).

Figure 5:
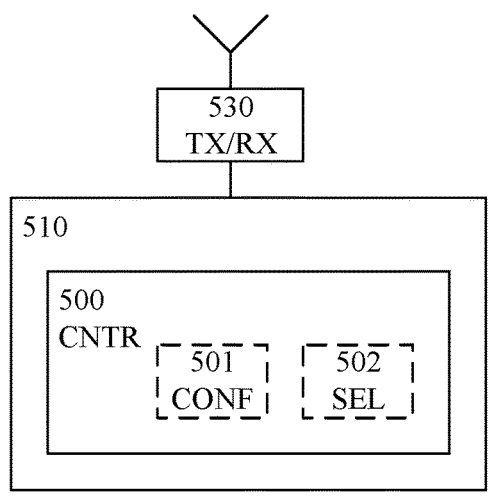
FIG. 5 is a schematic block diagram illustrating an example apparatus according to some embodiments.

FIG. 5 schematically illustrates an example apparatus 510 according to some embodiments. The apparatus is for a transmitter (TX; e.g., transmitting circuitry or a transmission module)—illustrated herein as part of a transceiver (TX/RX) 530—configured to transmit a physical layer packet comprising a plurality of measurement signals for channel estimation.

The apparatus 510 and/or the transceiver 530 may be comprised in a transmitter device (e.g., a non-sensing device), such as a wireless communication device. An example wireless communication device is a station (STA; e.g., an access point, AP) configured for operation in accordance with IEEE 802.11.

For example, the apparatus 510 may be configured to perform, or cause performance of, one or more of the method steps described in connection with FIG. 1. Any suitable feature described above, in connection with FIG. 1 or otherwise, may be equally applicable for the context of FIG. 5, even if all details are not repeated below.

The apparatus 510 comprises a controller (CNTR; e.g., controlling circuitry or a control module) 500.

The controller is configured to cause configuration of the transmitter to use different precoding settings for at least two of the plurality of measurement signals for channel estimation (compare with step 140 of FIG. 1).

To this end, the controller may be associated with (e.g., connectable, or connected, to) a configurer (CONF; e.g., configuring circuitry or a configuration module) 501. The configurer 501 may be adapted to configure the transmitter to use different precoding settings for at least two of the plurality of measurement signals for channel estimation.

The controller may be configured to cause configuration of the transmitter to use different precoding settings for at least two of the plurality of measurement signals for channel estimation by causing selection of the different precoding settings from a collection of precoding settings; e.g., for WLAN sensing (compare with step 141 of FIG. 1).

To this end, the controller may be associated with (e.g., connectable, or connected, to) a selector (SEL; e.g., selecting circuitry or a selection module) 502. The selector 502 may be adapted to select the different precoding settings from the collection of precoding settings.

The controller is also configured to cause transmission of the physical layer packet (compare with step 150 of FIG. 1).

To this end, the controller may be associated with (e.g., connectable, or connected, to) a transmitter (e.g., transmitting circuitry or a transmission module); here illustrated as part of the transceiver 530. The transmitter may be adapted to transmit the physical layer packet.

The controller may also be configured to cause transmission of a precoding setting announcement (compare with step 120 of FIG. 1).

To this end, the controller may be associated with (e.g., connectable, or connected, to) a transmitter (e.g., transmitting circuitry or a transmission module); here illustrated as part of the transceiver 530. The transmitter may be adapted to transmit the precoding setting announcement.

The controller may also be configured to cause reception of a precoding setting request for measurement signals for channel estimation (compare with step 110 of FIG. 1).

To this end, the controller may be associated with (e.g., connectable, or connected, to) a receiver (e.g., receiving circuitry or a reception module); here illustrated as part of the transceiver 530. The receiver may be adapted to receive the precoding setting request.

Figure 6:
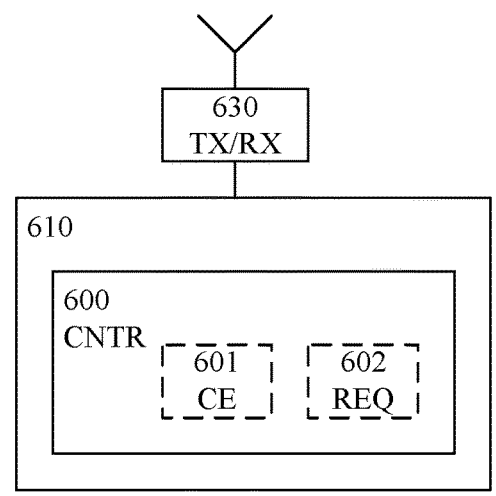
FIG. 6 is a schematic block diagram illustrating an example apparatus according to some embodiments.

FIG. 6 schematically illustrates an example apparatus 610 according to some embodiments. The apparatus is for a receiver (RX; e.g., receiving circuitry or a reception module)—illustrated herein as part of a transceiver (TX/RX) 630—configured to receive a physical layer packet comprising a plurality of measurement signals for channel estimation.

The apparatus 610 and/or the transceiver 630 may be comprised in a receiver device (e.g., a sensing device), such as a wireless communication device. An example wireless communication device is a station (STA; e.g., a non-AP STA) configured for operation in accordance with IEEE 802.11.

For example, the apparatus 610 may be configured to perform, or cause performance of, one or more of the method steps described in connection with FIG. 2. Any suitable feature described above, in connection with FIG. 2 or otherwise, may be equally applicable for the context of FIG. 6, even if all details are not repeated below.

The apparatus 610 comprises a controller (CNTR; e.g., controlling circuitry or a control module) 600.

The controller is configured to cause reception of a physical layer packet comprising a plurality of measurement signals for channel estimation, wherein different precoding settings are used for at least two of the plurality of measurement signals for channel estimation (compare with step 250 of FIG. 2).

To this end, the controller may be associated with (e.g., connectable, or connected, to) a receiver (e.g., receiving circuitry or a reception module); here illustrated as part of the transceiver 630. The receiver may be adapted to receive the physical layer packet.

The controller is also configured to cause performance of channel estimation based on the measurement signals for channel estimation (compare with step 260 of FIG. 2).

To this end, the controller may be associated with (e.g., connectable, or connected, to) a channel estimator (CE; e.g., channel estimating circuitry or a channel estimation module) 601.

The channel estimator 601 may be adapted to perform channel estimation based on the measurement signals for channel estimation.

The controller may also be configured to cause use of a channel estimation result for sensing (e.g., WLAN sensing), wherein the channel estimation result is differentiated based on the different precoding settings. For example, causing the use of the channel estimation result for sensing may comprise transmitting the channel estimation result to a central processing node configured to perform WLAN sensing and/or reporting the channel estimation result to a higher layer of a protocol stack.

The controller may also be configured to cause reception of a precoding setting announcement (compare with step 220 of FIG. 2).

To this end, the controller may be associated with (e.g., connectable, or connected, to) a receiver (e.g., receiving circuitry or a reception module); here illustrated as part of the transceiver 630. The receiver may be adapted to receive the precoding setting announcement.

The controller may also be configured to cause transmission of a precoding setting request for measurement signals for channel estimation (compare with step 210 of FIG. 2).

To this end, the controller may be associated with (e.g., connectable, or connected, to) a requestor (REQ; e.g., requesting circuitry or a request module) 602. The requestor 602 may be adapted to generate the precoding setting request (e.g., based on channel estimations) and provide the precoding setting request for transmission.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device (e.g., a station—STA—such as an access point—AP—or a non-AP STA).

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

Figure 7:
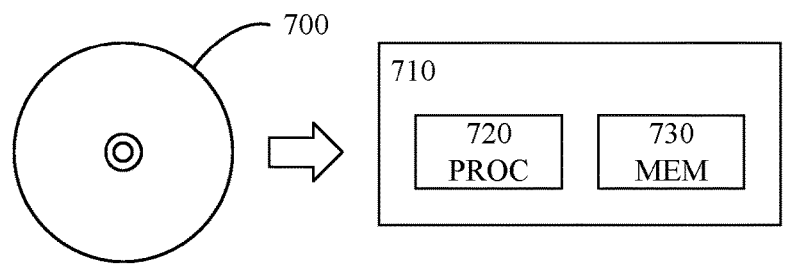
FIG. 7 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC; e.g., data processing circuitry or a data processing unit) 720, which may, for example, be comprised in a wireless communication device 710. When loaded into the data processor, the computer program may be stored in a memory (MEM) 730 associated with or comprised in the data processor. According to some embodiments, the computer program may, when loaded into and run by the data processor, cause execution of method steps according to, for example, any of the methods illustrated in FIGS. 1-3 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiment, and vice versa.

Hence, it should be understood that the details of the described embodiments are merely examples brought forward for illustrative purposes, and that all variations that fall within the scope of the claims are intended to be embraced therein.

The invention claimed is:

1. A method of a transmitter configured to transmit a physical layer packet comprising a plurality of measurement signals for channel estimation, the method comprising:
configuring the transmitter to use different precoding settings for at least two of the plurality of measurement signals for channel estimation; and
transmitting the physical layer packet;
the physical layer packet including a preamble and a data field, the data field including a plurality of midambles, each midamble including at least one measurement signal of the plurality of measurement signals for channel estimation, the different precoding settings being used for at least two midambles of the plurality of midambles, each one of the at least two midambles in the data field of the physical layer packet being different from each other and corresponding to a different beam characteristic.

2. The method of claim 1, wherein the transmitter is configured to use different precoding settings for at least three of the plurality of measurement signals for channel estimation.

3. The method of claim 1, wherein at least one of the plurality of measurement signals for channel estimation is included in the preamble of the physical layer packet.

4. The method of claim 3, wherein a precoding setting used for at least one other measurement signal that occurs outside of the preamble differs from all precoding settings used for measurement signals comprised in the preamble.

5. The method of claim 1, wherein at least one other measurement signal of the plurality of measurement signals for channel estimation occurs outside of the preamble of the physical layer packet.

6. The method of claim 1, wherein at least one of the plurality of measurement signals for channel estimation is comprised in a packet extension of the physical layer packet.

7. The method of claim 1, wherein configuring the different precoding settings for at least two of the plurality of measurement signals for channel estimation comprises configuring the precoding settings in accordance with a precoding setting pattern.

8. The method of claim 7, wherein the precoding setting pattern provides uniform selection from the collection of precoding settings for WLAN sensing.

9. The method of claim 7, wherein the precoding setting pattern provides non-uniform selection from the collection of precoding settings for WLAN sensing.

10. The method of claim 1, wherein the different precoding settings are selected from a collection of precoding settings for wireless local area network (WLAN) sensing.

11. The method of claim 1, further comprising transmitting a precoding setting announcement.

12. The method of claim 11, wherein the precoding setting announcement is indicative of one or more of:
configured precoding settings;
the configured precoding settings for one or more of the measurement signals for channel estimation; and
which measurement signals for channel estimation have a same precoding setting.

13. The method of claim 11, wherein the precoding setting announcement is comprised in one or more of: a broadcast signal, a beacon signal, a receiver-dedicated signal, a header field of the physical layer packet, and a medium access control header field associated with the physical layer packet.

14. The method of claim 1, further comprising receiving a precoding setting request for measurement signals for channel estimation, and selecting the different precoding settings based on the request.

15. The method of claim 1, wherein the physical layer packet is a physical layer (PHY) protocol data unit (PPDU), or a high efficiency (HE) PPDU, or an extremely high throughput (EHT) PPDU.

16. The method of claim 1, wherein the measurement signal for channel estimation comprises one or more of: a long training field (LTF), a HE-LTF, and a EHT-LTF.

17. The method of claim 1, wherein the transmitter is configured to transmit the physical layer packet in accordance with a listen-before-talk procedure.

18. A method of a receiver, the method comprising:
 receiving a physical layer packet, the physical layer packet including a plurality of measurement signals for channel estimation, a preamble, and a data field, different precoding settings being used for at least two of the plurality of measurement signals for channel estimation, the data field including a plurality of midambles, each midamble including at least one measurement signal of the plurality of measurement signals for channel estimation, the different precoding settings being used for at least two midambles of the plurality of midambles, each one of the at least two midambles in the data field of the physical layer packet being different from each other and corresponding to a different beam characteristic; and
 performing channel estimation based on the measurement signals for channel estimation.

19. An apparatus for a transmitter configured to transmit a physical layer packet comprising a plurality of measurement signals for channel estimation, the apparatus comprising controlling circuitry configured to cause:
 configuration of the transmitter to use different precoding settings for at least two of the plurality of measurement signals for channel estimation; and
 transmission of the physical layer packet;
 the physical layer packet including a preamble and a data field, the data field including a plurality of midambles, each midamble including at least one measurement signal of the plurality of measurement signals for channel estimation, different precoding settings being used for at least two midambles of the plurality of midambles, each one of the at least two midambles in the data field of the physical layer packet being different from each other and corresponding to a different beam characteristic.

* * * * *